(12) United States Patent
Mecca et al.

(10) Patent No.: US 11,394,945 B2
(45) Date of Patent: Jul. 19, 2022

(54) SYSTEM AND METHOD FOR PERFORMING 3D IMAGING OF AN OBJECT

(71) Applicant: Kabushiki Kaisha Toshiba, Minato-ku (JP)

(72) Inventors: Roberto Mecca, Cambridge (GB);
Roberto Cipolla, Cambridge (GB);
Fotios Logothetis, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 170 days.

(21) Appl. No.: 16/940,744

(22) Filed: Jul. 28, 2020

(65) Prior Publication Data

US 2021/0044788 A1    Feb. 11, 2021

(30) Foreign Application Priority Data

Aug. 8, 2019 (GB) ..................................... 1911354

(51) Int. Cl.
*H04N 13/122* (2018.01)
*G06T 7/586* (2017.01)
(Continued)

(52) U.S. Cl.
CPC ........... *H04N 13/122* (2018.05); *G06T 7/586* (2017.01); *H04N 5/2253* (2013.01);
(Continued)

(58) Field of Classification Search
CPC ........... G06T 2207/10012; G06T 2207/10016; G06T 2207/10152; G06T 7/586; H04N 13/111; H04N 13/122; H04N 13/221; H04N 13/239; H04N 13/254; H04N 13/282; H04N 2013/0081; H04N 5/2253; H04N 5/2256

See application file for complete search history.

(56) References Cited

U.S. PATENT DOCUMENTS

| | | | | |
|---|---|---|---|---|
| 2009/0073259 A1* | 3/2009 | Hernandez | ........... | H04N 13/254 348/E13.021 |
| 2012/0287247 A1* | 11/2012 | Stenger | ................ | H04N 13/254 348/47 |
| 2015/0338651 A1* | 11/2015 | Wang | ...................... | G06F 3/013 345/8 |

OTHER PUBLICATIONS

Search Report dated Jan. 13, 2020 in United Kingdom Patent Application No. GB1911354.7, 6 pages.
(Continued)

*Primary Examiner* — Ming Wu
(74) *Attorney, Agent, or Firm* — Oblon, McClelland, Maier & Neustadt, L.L.P.

(57) ABSTRACT

A system for producing a 3D image of an object, the system includes: a processor adapted to receive multiview stereo photometric data, the multiview photometric stereo data including a first set of image data, wherein the first set of image data includes images captured by the first camera at a plurality of positions with illumination from different illumination directions such that there are a plurality of images from a different illumination direction for each position of the first camera, the processor being adapted to process the multiview photometric stereo data using a photometric stereo approach with a formulation of the irradiance using a reflection model that models both diffuse and specular reflection.

19 Claims, 16 Drawing Sheets

(51) Int. Cl.
  H04N 13/239 (2018.01)
  H04N 13/111 (2018.01)
  H04N 13/282 (2018.01)
  H04N 5/225 (2006.01)
(52) U.S. Cl.
  CPC ......... *H04N 13/111* (2018.05); *H04N 13/239* (2018.05); *H04N 13/282* (2018.05); *G06T 2207/10012* (2013.01)

(56) References Cited

U.S. PATENT DOCUMENTS

2017/0069059 A1* 3/2017 Urfalioglu ............. G06V 10/42
2017/0309014 A1* 10/2017 Fleming ............... A61B 3/0025

OTHER PUBLICATIONS

Roberto Mecca, et al., "Unifying Diffuse and Specular Reflections for the Photometric Stereo Problem" HAL Archives-Ouvertes, 2016 IEEE WACV, available at: http://hal.archives-ouvertes.fr/hal-01531190/document, 2016, 11 pages.

Maryam Khanian, et al., "Photometric Stereo for Strong Specular Highlights" Computational Visual Media, 4, available at: http://arxiv.org/pdf/1709.01357.pdf, 2018, pp. 1-16.

Fotios Logothetis, et al., "A Differential Volumetric Approach to Multi-View Photometric Stereo" arXiv:1811.01984, 2018, 9 pages.

Robert Maier, et al., "Intrinsic3d: High-Quality 3d Reconstruction by Joint Appearance and Geometry Optimization with Spatially-Varying Lighting" arXiv:1708.01670v1, IN ICCV, 2017, pp. 1-14.

Jaesik Park, et al. "Robust Multiview Photometric Stereo Using Planar Mesh Parameterization" IEEE Transactions on Pattern Analysis and Machine Intelligence, vol. 39, No. 8, Aug. 2017, pp. 1591-1604.

Japanese Office Action dated Jul. 13, 2021 in Japanese Patent Application No. 2020-096120 (with English translation), 10 pages.

Logothetis, F., "Detailed and Practical 3 D Reconstruction with Advanced Photometric Stereo Modelling", Doctoral Thesis, University of Cambridge, May 2019, https://www.repository.cam.ac.uk/handle/1810/292450 18, 151 pages.

* cited by examiner

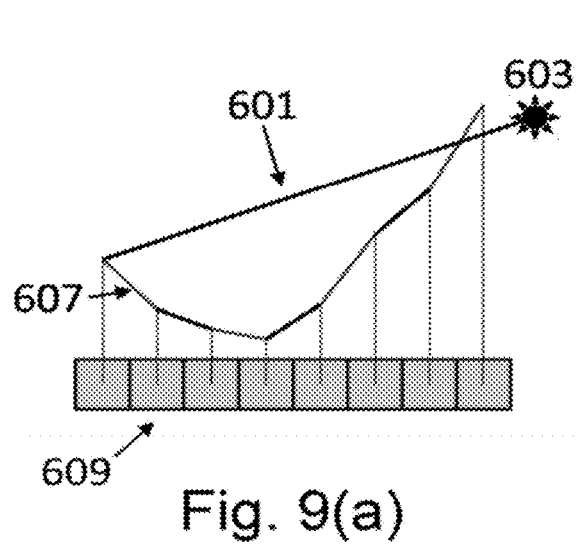
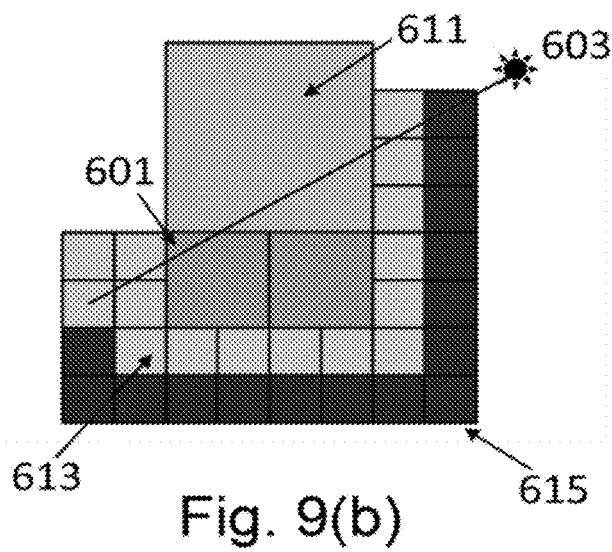
Fig. 9(a)  Fig. 9(b)
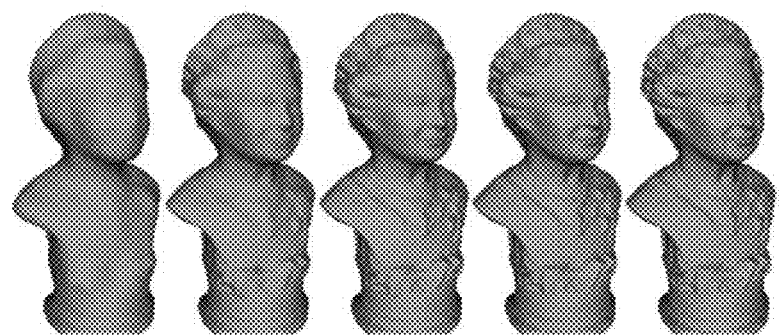
Fig. 10(a)
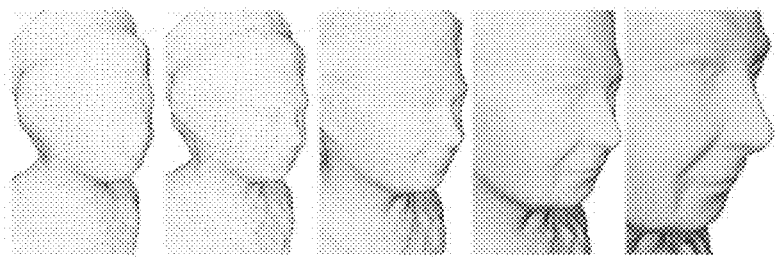
Fig. 10(b)

SYSTEM AND METHOD FOR PERFORMING 3D IMAGING OF AN OBJECT

PRIORITY APPLICATION

This application claims the benefit of priority of GB Patent Application Number No. 1911354.7, filed on 8 Aug. 2019.

FIELD

Embodiments described herein are concerned with systems and methods for performing 3D imaging of an object.

BACKGROUND

Recovering the 3D geometry of an object is a challenge in computer vision as most of the techniques provide good results in specific frameworks. In particular, two well-known approaches namely multi-view and photometric stereo have been developed to produce great results considering key complementary assumptions. Indeed, while multi-view is assumed to provide rough 3D volumetric reconstructions of textured objects, photometric stereo is supposed to retrieve highly detailed surfaces from a single view. High quality volumetric reconstruction of objects achieved by refining coarse multi-view reconstruction with shading information is one possible way of merging complementary information.

BRIEF DESCRIPTION OF THE FIGURES

FIG. 9($a$) is a schematic showing ray tracing and FIG. 9($b$) is a schematic showing ray tracing and varying the voxel size in accordance with an embodiment;

FIG. 10($a$) and FIG. 10($b$) are results showing the capturing of a surface of a 3D model at different resolution stages;

FIG. 12($b$) shows the visual hull from FIG. 11 and FIGS. 12($c$) to ($e$) show initial estimates of the object as a start point for the methods described herein;

DETAILED DESCRIPTION

Figure 1:
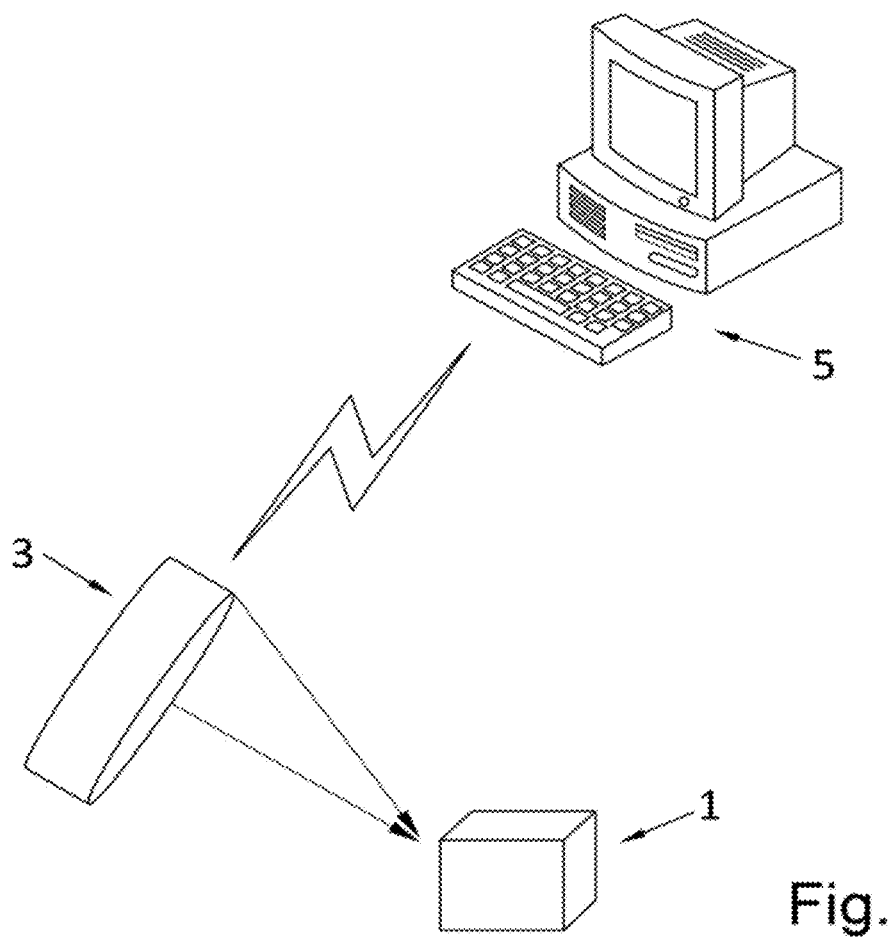
FIG. 1 is a schematic of a system in accordance with an embodiment.

In an embodiment, a system is provided for producing a 3D image of an object, the system comprising:
   a processor adapted to receive multiview stereo photometric data, said multiview photometric stereo data comprising a first set of image data, wherein said first set of image data comprises images captured by said first camera at a plurality of positions with illumination from different illumination directions such that there are a plurality of images from a different illumination direction for each position of the first camera,
   said processor being adapted to process said multi-view photometric stereo data using a photometric stereo approach with a formulation of the irradiance using a reflection model that models both diffuse and specular reflection.

The above allows a volumetric approach to the multi-view photometric stereo problem defined by a unified differential model. The above method uses a signed distance field parameterisation which avoids the complex step of re-projecting high frequency details.

The volumetric parameterisation together with the octree implementation allows a photometric modeling that efficiently ray-traces occlusions, discontinuities, shadows, etc. Also, the formulation includes a near-field photometric image formation model capable of handling a number of physical factors among which point light propagation and attenuation and both diffuse and specular reflections. This allows sub-millimeter precise 3D reconstructions with a reasonable number of photometric stereo acquisition outperforming state-of-the-art methods on both synthetic and real-world scenes.

In an embodiment, a second camera is provided and the camera positions and initial estimate is determined using non-photometric stereo methods. Thus, in an embodiment, the processor is adapted to receive stereo image data, said stereo image data comprising a second set of image data, said image data comprising pairs of images, wherein each pair of images is an image taken by the first camera and an image taken by a second camera with a known position with respect to the first camera, the processor being adapted to determine the global position of the first and second camera for each pair of images.

In an embodiment, the first and second cameras have different fields of view. Having two cameras allows to get the scale of the world together with more robust camera positions. The cameras use lenses with different focal length which allow different Field of Views to enforce the stereo tracking acquiring features from the scene and the environment as well.

The first and second cameras may be provided on a mount that is moveable, said first camera is provided surrounded by a plurality of individual light sources, said individual light sources being controllable such that just one light source can be controlled to be on at any one time.

As mentioned above, in an embodiment, the photometric stereo approach determines the position of the surface of the object by using a signed distance function where the signed distance function determines the distance from a point to a surface, wherein the signed distance function is related to the surface normal:

$$n(x) = \nabla d(x). \quad (1)$$

where n(x) is the surface normal at 3D point x, d(x) is the signed distance function at 3D point x and $\nabla$ is the gradient operator, the signed distance function being substituted for the surface normal when modelling irradiance.

By using the above, the surface is indicated when the signed distance function is at a minimum.

In an embodiment, the processor processes the photometric stereo data using a volumetric approach, wherein the volume containing the object is subdivided into voxels and the signed distance function is calculated per voxel.

The processor may be adapted to process the photometric stereo data using an iterative approach, wherein the voxel size is set to a first size and then subdivided further if the signed distance function is below a threshold.

The processor may be adapted obtain an initial estimate of the signed distance function from the stereo image data.

In a further embodiment, the processor is adapted to perform ray tracing a voxel towards the first camera or a light to determine for occlusions. This may be done by determining occlusions from a change in sign of the signed distance function between voxels along the ray being traced.

The processor is adapted to determine irradiance using a reflection model that models both diffuse and specular reflection using a parameter that indicates the shininess of the surface of the object. The shininess parameter may be fixed for the object and determined prior to processing of the PS data. In a further embodiment, the shininess parameter is an unknown and determined with the SDF.

In an embodiment, the processor is adapted to determine irradiance using a reflection model that models both diffuse and specular reflection using a Blinn Phong reflection model:

$$i_k(u) = i_k(x) = \rho(x)a_k(x)(\bar{n}(x) \cdot \bar{w}_k(x))^{\frac{1}{c(x)}} \quad (2)$$

where $u \in \mathbb{R}^2$ is the image-plane projection of the 3D point x, $\rho(x)$ indicates the albedo, $a_k(x)$ indicates the attenuation, c(x) indicated shininess and wk(x) is the weighted half vector:

$$w_k(x) = \bar{l}_k(x) + \min\left\{1, \frac{|1 - c(x)|}{\varepsilon}\right\}\bar{v}_q(x) \quad (3)$$

with $v_q(x)$ being the $q^{th}$ viewing direction on the volume for the camera position $C_q$ and $\varepsilon$ is a transition parameter.

In a further embodiment, the processor is adapted to process a plurality of image pairs, wherein each image pair comprises a pair of images from the same camera viewpoint illuminated from different illumination directions and the plurality of image pair comprises images from different camera viewpoints, wherein a visibility weight is applied to each image pair.

For example, each image pair may be processed to produce:

$$b_{hk}(x) \cdot \nabla d(x) = 0 \quad (7)$$

where $$b_{hk}(x) = \bar{w}_k(x)(i_n(x)a_k(x))^{c(x)} - \bar{w}_h(x)(i_k(x)a_h(x))^{c(x)}. \quad (8)$$

and the visibility weighting is applied to $b_{hk}(x)$.

Equation (7) above may be solved as a weighted least squares problem.

The above equations may be stacked and solved for each voxel.

The above system has many uses. In one embodiment, it is used as part of an inspection apparatus, said apparatus also comprising:
 a first camera;
 a second camera;
 a plurality of spatially distributed light sources.

The above system may be used in combination with known object recognition and registration methods.

In one embodiment, the system is used to generate 3D images of objects with a high shine such as metal objects. It usually ranges between 1 (purely diffuse reflection) to 0.2 when the specular reflections are predominant (e.g. metal objects).

The above can be used in an highly accurate quality control system via 2D photometric images of volumetric reconstruction of geometrically complex objects.

It can also be used 3D volumetric scanning technology of highly specular objects for quality control purposes.

It can also be used for handheld/portable 3D scanners.

In a further embodiment, a method for producing a 3D image of an object is provided, the method comprising:
 receiving multi-view stereo photometric data, said multi-view photometric stereo data comprising a first set of image data, wherein said first set of image data comprises images captured by said first camera at a plurality of positions with illumination from different illumination directions such that there are a plurality of images from a different illumination direction for each position of the first camera,
 processing said multi-view photometric stereo data using a photometric stereo approach with a formulation of the irradiance using a reflection model that models both diffuse and specular reflection.

The above may be implemented by software running on a computer. The software may be provided on a physical carrier or as a software download.

FIG. 1 is a schematic of a system in accordance with an embodiment. The system can be used capture 3D image data of an object or scene and reconstruct the object. As used herein, the term "object" will be used to denote what is being imaged. However, it should be noted that this could cover a plurality of objects or a scene et cetera.

In an embodiment, the 3D image data is captured using apparatus 3. The detail of apparatus 3 would be described reference to FIG. 2.

The data obtained by apparatus 3 sent to computer 5 and processed. In FIG. 1, computer 5 is shown as a desktop computer. However, it can be any processor, for example, a distributed processor or a processor or a mobile phone et cetera. Details of a possible example processor will be described with reference to FIG. 23.

Figure 2:
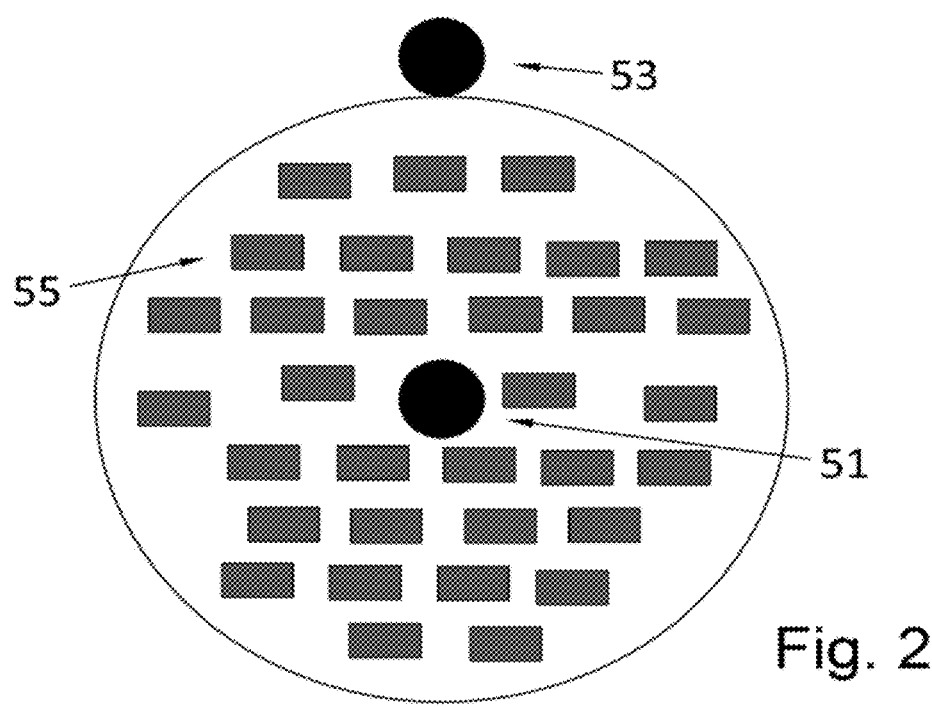
FIG. 2 is a schematic showing an arrangement of the cameras and lights for performing 3D imaging in accordance with an embodiment.

FIG. 2 shows in detail a possible arrangement of apparatus 3 of FIG. 1. FIG. 2 shows a mount that holds a first camera 51, a second camera 53 and a plurality of light sources 55 in fixed relationship with one another. This allows first camera 51, second camera 53 and light sources 55 to be moved together and maintained at a constant separation from each other.

In an embodiment, light sources surround the first camera 51. The $2^{nd}$ camera 55 is provided at the edge of the light sources. In an embodiment, the first camera in the $2^{nd}$ camera used together to perform a 2-view stereo measurement. The first camera 51 is used alone with the light sources 55 to obtain the multiview photometric stereo data.

In an embodiment, the 2 cameras will have different focal lengths. Focal length of the first camera (that is useful multiview stereo) will be longer than the focal length of the $2^{nd}$ camera. Due to the longer focal length of first camera coverage can be used to capture fine details of the object surface and provided close to the object surface. The first camera can be used to obtain near field data.

The second camera 53 has a larger field of view the first camera 51 and this larger field of view allows better matches between subsequent images when performing 2-view stereo imaging.

In a particular specific embodiment, two FLIR cameras FL3-U3-32S2C-CS are used as the first and second cameras. The first camera 51 has an 8 mm lens and is surrounded by OSRAM ultra-bright LEDs as the light sources 55 for capturing data in the near-field. The second camera 53 has a 4 mm lens for acquiring a wider area helping to track the trajectories of both cameras. In this specific example, the distance between the 2 cameras is 15 cm. However, many different distances could be used, for example from 3 to 6 cm. In a further example, 4.5 cm could be used.

Thus, the 8 mm lens can take more details on the object surface. The two cameras are used to enforce the MVS with a wider viewing angle 4 mm lens capable of providing more reliable matches among views.

Figure 3:
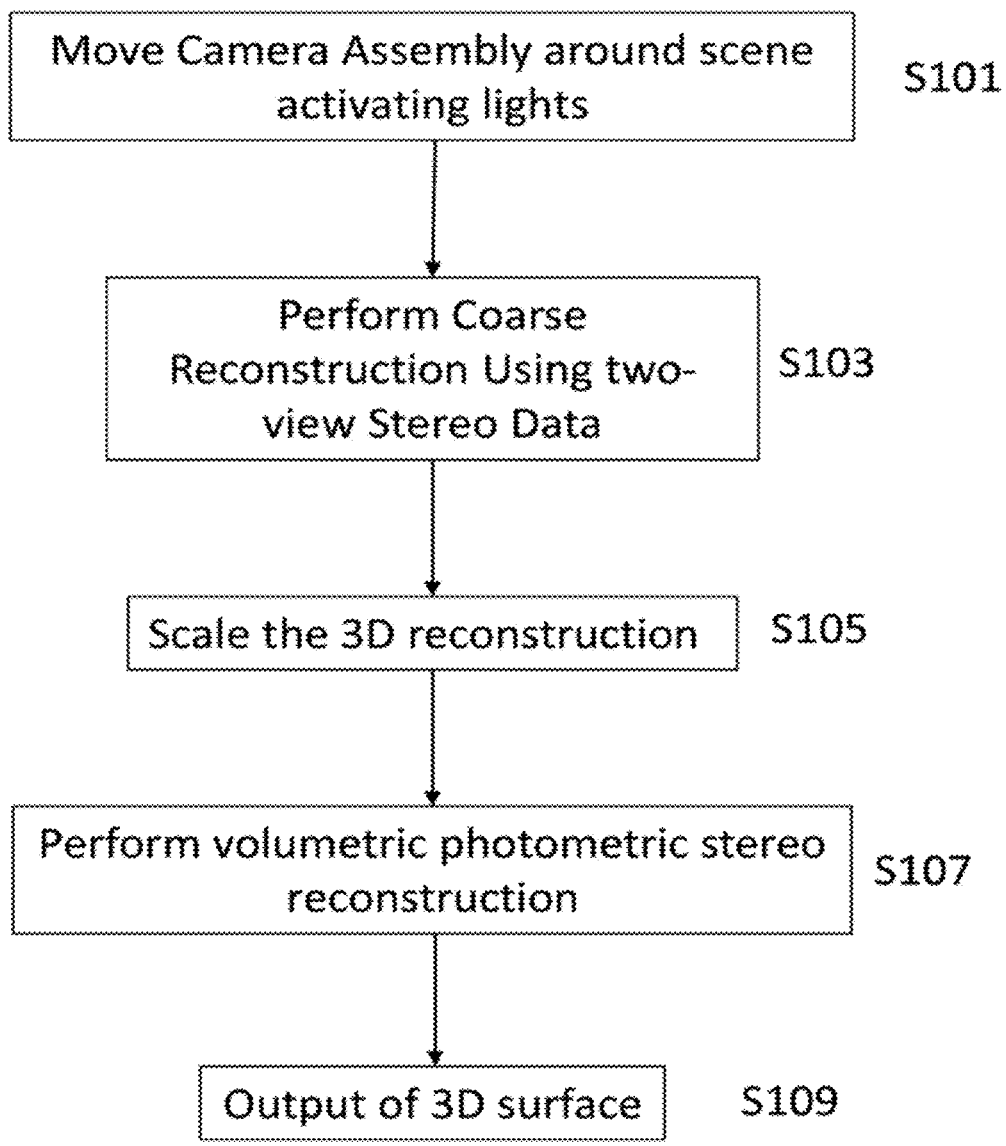
FIG. 3 is a flow chart showing a method in accordance with an embodiment.

The basic steps of a method in accordance with an embodiment will now be described with reference to FIG. 3.

In step S101, the camera assembly 3 (from FIG. 1) is moved around the object 1.

Prior to moving the assembly 3, the first and second cameras were calibrated using Matlab's computer vision toolbox and a checkerboard, in order to be able to capture the absolute scale of the world, which will be used for the near light modeling (which will be described with reference to equation 4 below.

In step S101, the camera assembly of FIG. 2 is moved around the object 1 of FIG. 1. The multi-view stereo data is collected from the two cameras. Photometric stereo data is acquired by using the single, central camera 51. Individual LEDs 55 are activated one after another to allow the central camera to capture the photometric stereo data. In an embodiment, images captured using sequences of between 6 to 8 LEDs are used.

Figure 4:
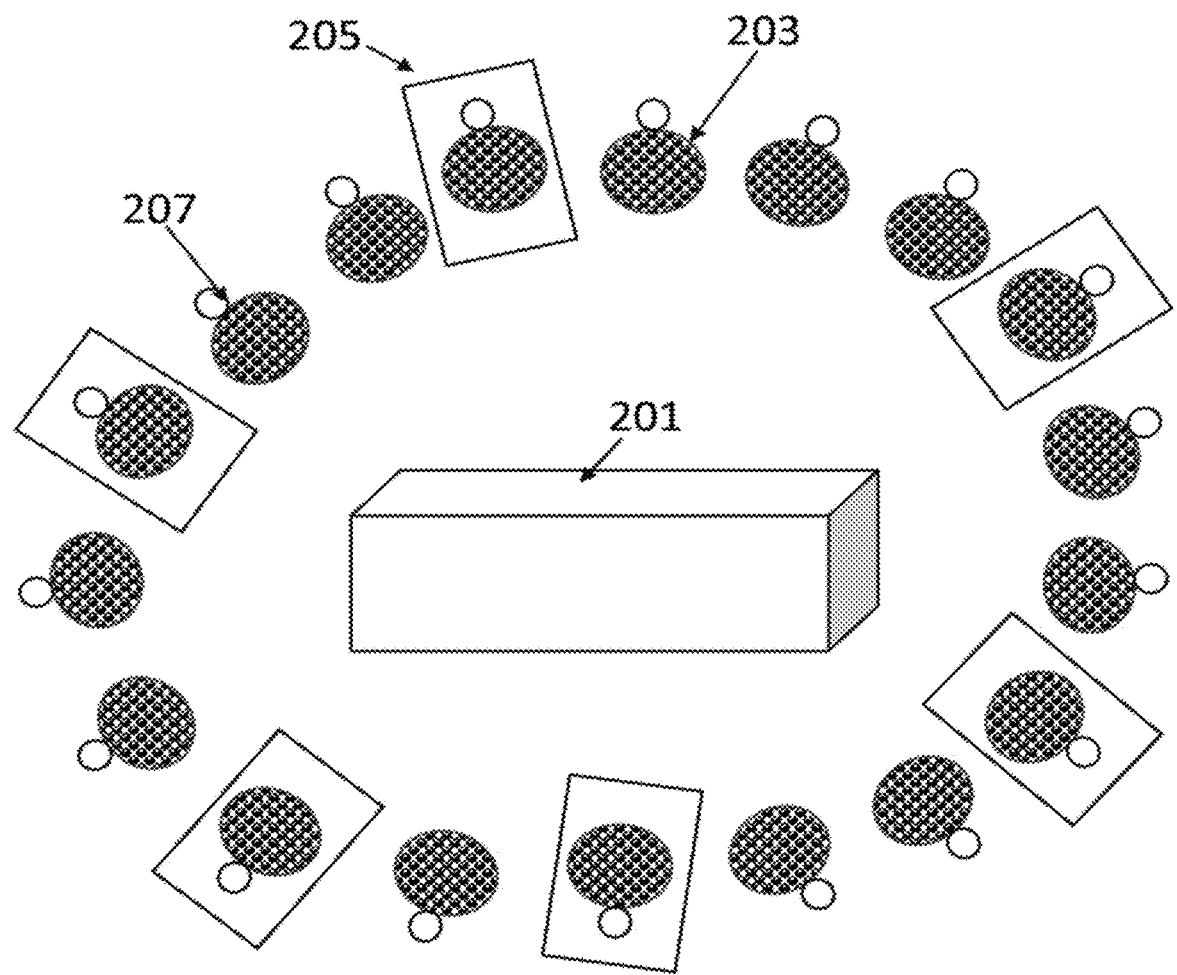
FIG. 4 is a schematic of the collection of photometric stereo (PS) data and multi view stereo (MVS) image data.

The images have been acquired while moving the setup around the scene. FIG. 4 shows a schematic of moving the camera assembly 203 (which corresponds to camera assembly 3 of FIG. 1) around the object 201. The camera assembly is moved around the object and images are captured at each camera viewpoint and a plurality of different lighting conditions. In each different lighting condition, the object is illuminated from a single illumination direction. This is achieved by switching on just one light source. At various positions, to view stereo is also collected by using the two cameras. These points are shown as the camera assembly in a box, for example 205. Therefore, there are plurality of positions 205 where both multi-view stereo and photometric stereo images are obtained and positions 207 were just multi-view photometric stereo images are obtained.

In step S103, a coarse reconstruction is obtained using the multi view stereo data (i.e. images from the two cameras 51, 53). This image is constructed using non-photometric techniques, i.e. the illumination direction of the object is not used in the reconstructions. To avoid confusion, this data will be referred to as MVS data. Data taken from a single camera from different illumination directions will be referred to as PS data.

In an embodiment, the COLMAP-SFM algorithm is used to process MVS data to get camera rotation and translation between the photometric stereo views as well as a low quality reconstruction to use as initial estimate. How this initial estimate will be used will be described below.

In addition, a few more images were captured in between the photometric stereo (PS) sequences (with neutral illumination) in order to make SFM more robust with respect to a too small over-lap between images. To make the models obtained through MVS have less noise, some noisy regions and background points far away from the scenes of interest were removed.

COLMAP looks for global matches among all the images in the MVS acquisition (e.g. from both cameras). COLMAP does not know the relative camera pose ("camera separation"), but this information is used a posteriori to scale the 3D reconstruction (from COLMAP) in step S105 in order to have the correct size. By using two cameras for reconstructing 3D scene with MVS allows one find out the "scale of the world".

Then Poisson reconstruction is performed with a low level setting so as the initial estimate contains continues surfaces (and not point clouds). Finally, an initial estimate of the signed distance function (SFD) is performed as the distance transform of the initial surface.

In addition, minimal prepossessing to remove saturated and very dark regions that translates in shadow area to improve the photometric image quality.

Figure 5:
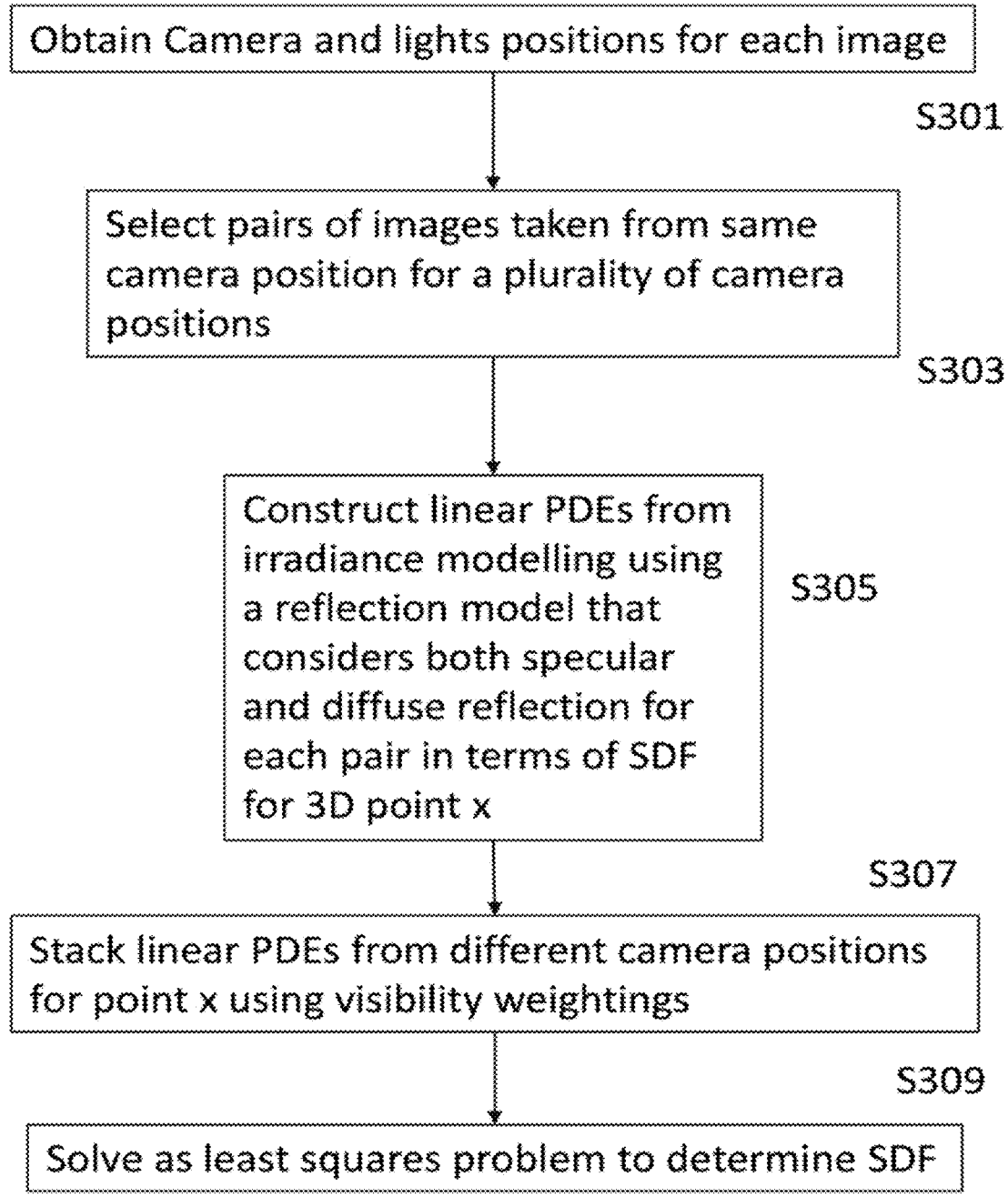
FIG. 5 is a flow chart in accordance with an embodiment for determining an SDF.

In step S107, the signed distance function is determined. How this is done will now be described with reference to FIG. 5.

From the above steps, the following are known:

Global positions of the first and second cameras and the positions of the light that was one for each PS image. This therefore provides knowledge of:

$C_q$ the camera position of the first camera in the $q^{th}$ position $v_q(x)$ the $q^{th}$ viewing direction on the volume for 3D point x for $C_q$ $p_k$—the known position of the light source with respect to the global coordinate system In addition, the following are known:

$\Phi_k$—the intrinsic brightness of the light source $s_k$—the principle direction of the light source $\mu_k$—the angular dissipation factor of the light source?

In step S301, the above data is retrieved for use in determining the SDF.

In an embodiment, to provide suitable mathematical characterisation of a collection of solid objects, the implicit surface parameterisation is considered in terms of the signed distance function SDF $d(x)$, $x \in \mathbb{R}^3$.

A signed distance function, when given the coordinates of a point x return the shortest distance between x and a defined surface. This parameterisation is suitable for this embodiment due to its practical way of describing the outgoing normal vector to a surface.

The SDF allows the volumetric surface to be described as the zeroth level-set of d, $d(x)=0$.

In the approach described herein, is a differential approach which is based on the observation that the surface normal N equals to gradient of the SDF D as follows:

$$n(x) = \nabla dx). \tag{1}$$

The SDF is then used for the irradiance equation to derive a volumetric differential multi-view photometric stereo formulation where it is assumed to have $N_{ps}$ images (i.e. light sources) for each known camera position $C_q$ (that is $N_{ps}(C_q)$, $q=1, \ldots N_{views}$).

To exploit the monocular aspect of the photometric stereo problem, image ratios for the irradiance equation that switch between diffuse and specular reflection in a unified fashion are considered.

$$i_k(u) = i_k(x) = \rho(x) a_k(x) (\bar{n}(x) \cdot \bar{w}_k(x))^{\frac{1}{c(x)}} \tag{2}$$

where $u \in \mathbb{R}^2$ is the image-plane projection of the 3D point x, $\rho(x)$ indicates the albedo and $a_k(x)$ indicates the attenuation. The shininess parameter $c(x)$ allows switching between diffuse reflection when $c(x)=1$ and specular Blinn-Phong reflection when $0<c(x)<1$.

In Blinn-Phong reflection, to model shading, a half way vector is calculated which is half way between the vector defining the viewing direction and the vector defining the direction of the light source. This allows the modelling of specular lighting when there is a large angle between the direction of viewing and the direction of light reflection.

To switch between diffuse and specular reflection, the following weighted half vector is considered:

$$w_k(x) = \bar{l}_k(x) + \min\left\{1, \frac{|1-c(x)|}{\varepsilon}\right\} \bar{v}_q(x) \tag{3}$$

with $v_q(x)$ being the $q^{-th}$ viewing direction on the volume for the camera position $C_q$ and $\varepsilon$ a transition parameters set to $10^{-4}$.

In an embodiment, as a volumetric approach is being considered, the irradiance equation can be considered for each 3D point x. Light sources can then be modelled by considering the following $l_k(x)=x-p_k$, where $p_k$ is the known position of the point light source with respect to the global coordinate system. The bar over a vector means that it is normalized $$\left(\text{i.e. } \bar{n} = \frac{n}{|n|}\right).$$

The light attenuation can then be modelled considering the following non-linear radial model of dissipation $$a_k(x) = \Phi_k \frac{(\bar{l}_k(x) \cdot s_k)^{\mu_k}}{\|l_k(x)\|^2} \tag{4}$$

where $\Phi_k$ is the intrinsic brightness of the light source, $s_k$ is the principal direction (i.e. the orientation of the LED point light source) and $\mu_k$ is an angular dissipation factor.

In an embodiment, an image ratio method is used that significantly simplifies the photometric stereo problem by eliminating the dependence on the albedo as well as the non-linear normalisation of the normal. Thus, in step, S303, pairs of images are selected.

Dividing equations for images $i_h$ and $i_k$ (different light sources from the same point of view $C_q$) gives:

$$\left(\frac{i_h(x) a_k(x)}{i_k(x) a_h(x)}\right)^{c(x)} = \frac{n(x) \cdot \bar{w}_h(x)}{n(x) \cdot \bar{w}_k(x)} \tag{5}$$

which leads to:

$$n \cdot (\bar{w}_k(x)(i_n(x) a_k(x))^{c(x)} - \bar{w}_h(x)(i_k(x) a_h(x))^{c(x)}) = 0. \tag{6}$$

By substituting the parametrisation of the normal from, the following albedo independent, homogeneous linear PDE is produced in step S305:

$$b_{hk}(x) \cdot \nabla d(x) = 0 \tag{7}$$

where $$b_{hk}(x) = \bar{w}_k(x)(i_h(x) a_k(x))^{c(x)} - \bar{w}_h(x)(i_k(x) a_h(x))^{c(x)}. \tag{8}$$

The geometrical meaning of (7) is the extension to the 3D volumetric reconstruction of a PDE approach. In fact, the photometric stereo model still consists of a homogeneous linear PDE where the tangentiality of $b_{hk}$ on the surface is by definition the zeroth level set of the SDF. However, $b_{hk}(x)$ does not depend on d (i.e. (7) is linear) due to the fact that the relevant quantities are expressed on a global coordinate system independent of the existence of a surface. This SDF formulation is a more natural 'object centered' depth and this allows for a unified optimisation as will be described below.

In order to simplify the notation, the pair hk will be renamed as p which will be used for the set of all the combination of pairs of images (with no repetition).

To be able to handle multiple photometric stereo images coming from different views in a single mathematical framework, the weighted version of eqn 7 is stacked in a single system in step S307:

$$w_p(C_q, x) b_p(x) \cdot \nabla d(x) = 0 \tag{9}$$

where $w_p(C_q, x) = \max(n(x) \cdot v_q(x), 0)$. This weight term $w_p$ is essentially a measure of visibility. The resulting system then counts $$\sum_{q=1}^{N_{views}} \binom{N_{ps}(C_q)}{2}$$

equations as shown in eqn (10):

$$\begin{bmatrix} [w_1(C_1, x)b_1(x)]^t \\ [w_2(C_2, x)b_2(x)]^t \\ \vdots \end{bmatrix} \nabla d(x) = 0 \qquad (10)$$

With the aim to solve the above as a least square problem in step S309, the normal equations are considered such that:

$$B(x)\nabla d(x) = 0 \qquad (11)$$

with:

$$B(x) = [w_1(C_1, x)b_1(x), w_2(C_2, x)b_2(x), \ldots] \cdot \begin{bmatrix} [w_1(C_1, x)b_1(x)]^t \\ [w_2(C_2, x)b_2(x)]^t \\ \vdots \end{bmatrix}$$

$B(x)$ is now a positive, semi-definite, 3×3 matrix.

The geometrical constraint coming from eqn (7) ensures that all the vector fields $b_p(x) \in \mathbb{R}^3$ span the same bi-dimensional space $\forall x$ of the volume as they define the level-set of the SDF. This means that under ideal circumstances, the rank of B in (11) should be exactly 2.

However, due to numerical approximations this is never exactly true. Thus, this constraint is enforced by using eigenvalue decomposition of B hence:

$$B = Q\Lambda Q^t = Q \begin{bmatrix} \Lambda_1 & 0 & 0 \\ 0 & \Lambda_2 & 0 \\ 0 & 0 & \Lambda_3 \end{bmatrix} Q^t \qquad (12)$$

With $\Lambda_1 \geq \Lambda_2 \geq \eta_3$ and setting $\Lambda_3 = 0$.

It should be noted that this rank correction is a sanity check step.

Indeed if $B\nabla d = 0$ with B full rank, then $\nabla d = 0$ which can never be true as $|\nabla d| = 1$ (Eikonal equation) and so d cannot be the SDF of any real surface. In fact, the Eikonal equation can be implicitly enforced by demanding that $\nabla d = q_3$, where $q_3$ is the third column of Q and corresponds to the null space of $B(q_3$ is a unit vector hence enforcing the Eikonal equation). Hence the regularised version of (11) becomes ($I_{3\times 3}$ is the identity matrix):

$$(B(x) + I_{3\times 3})\nabla d(x) = B_r(x)\nabla d(x) = q_3. \qquad (13)$$

This regularisation leads to a full rank system and sets the scale of d.

In an embodiment, a variational solver is built to compute the signed distance field based parameterisation introduced above.

In an embodiment, to avoid excessive computation, it is noted that the photometric stereo equations do not need to be computed in the whole volume but rather only to a subset of voxels $\Omega \subset \mathbb{R}^3$, which are close to the surface.

In fact, eqn (1) is only true in the vicinity of the surface. Thus, the variational problem is discretised by using first order forward finite differences $\nabla d = G \cdot d$, with d being the vector stacking d(x) in all of. G is the sparse kernel matrix describing the connectivity in $\Omega$.

It is noted that the differential approach is rank deficient (needing an integration constant for the theoretical minimal solution). To address this issue a Tikhonov regulariser of the form $d = d_0$ is used where $d_0$ is some initial estimate of the SDF obtained from the distance transform of the an initial surface estimate obtain from the MVS data in step S103 and S105. Thus the regularised problem becomes (using $\lambda = 0.05$):

$$\min_d (\|B_\Omega G d - q_\Omega\| + \lambda\|d - d_0\|) \qquad (14)$$

where $B_\Omega$ and $q_n$ are obtained by stacking the relevant quantities from (13) for all voxels in $\Omega$. The resulting linear system is solved with the conjugate gradients method.

To manage the required set of voxels $\in \Omega$ described above an octree structure is used. $\Omega$ is defined at the leafs of the tree and Voxel neighbors for computing finite differences are found by bottom up traversal of the tree.

Figure 6:
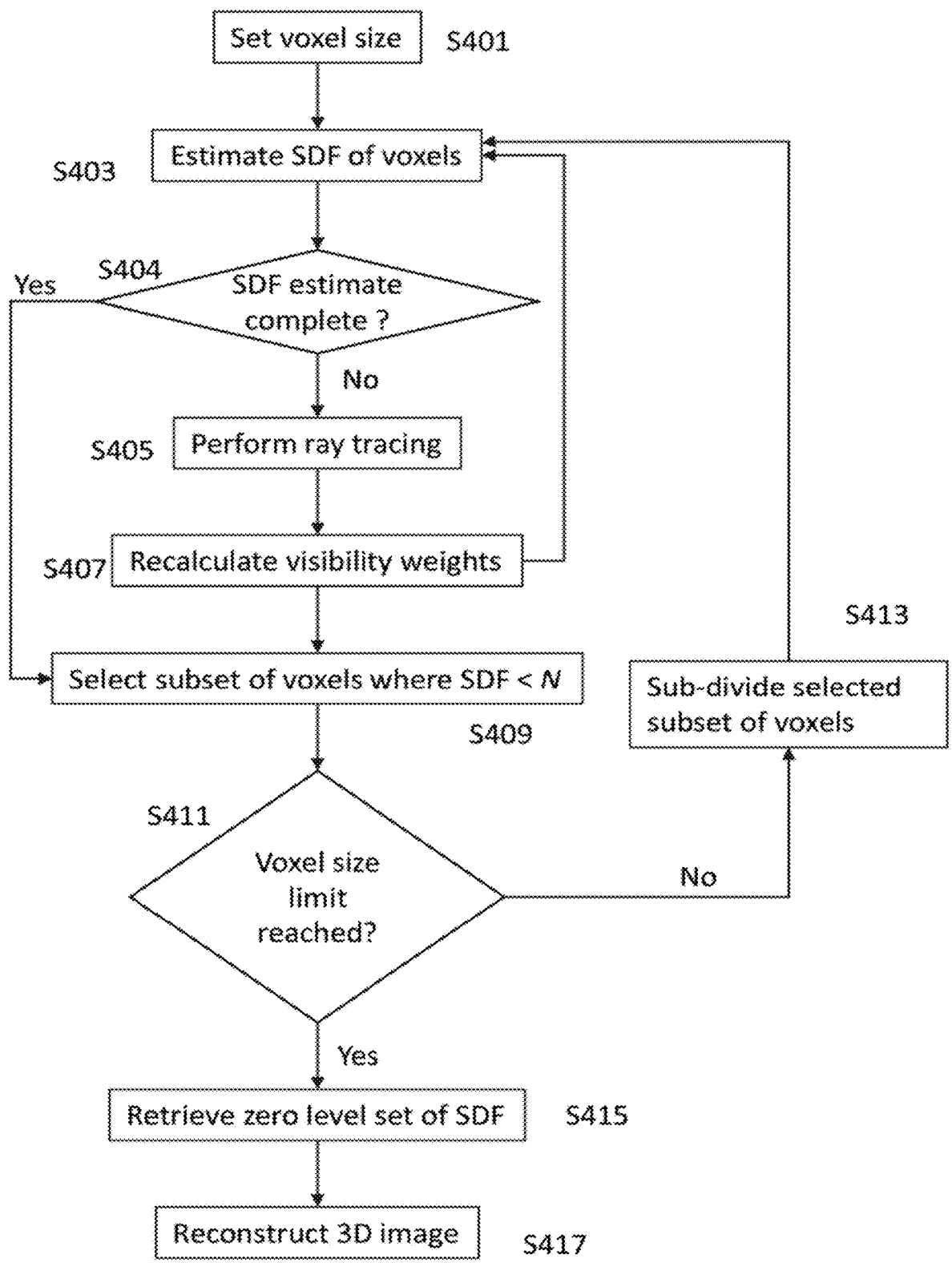
FIG. 6 is a flow chart showing the octree implementation.

An overview of this process will now be described with reference to FIG. 6.

Figure 7:
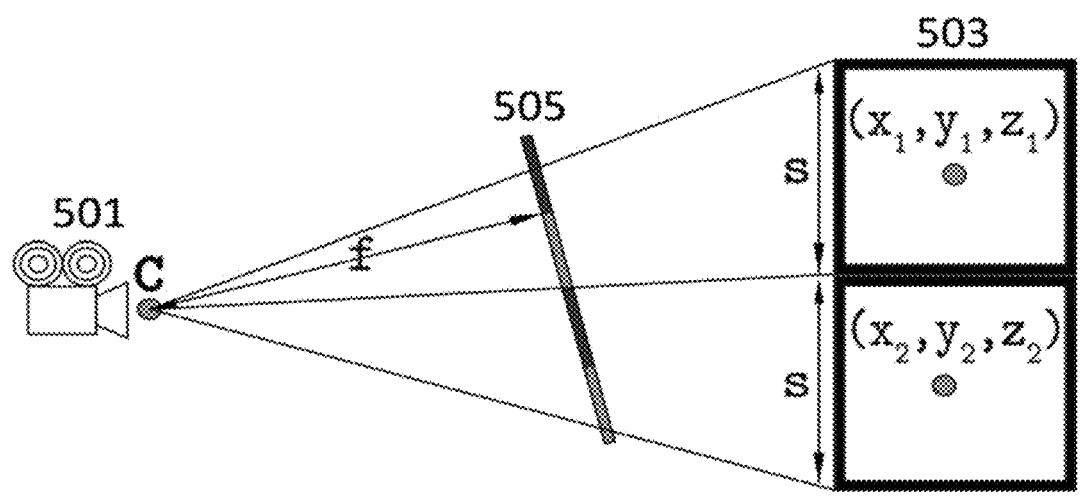
FIG. 7 is a diagram showing how the relationship between the image plane and voxels.

FIG. 7 shows the volume being discretised into a set of voxels with finite size s 503 This is used for determining correspondence to pixels in order to perform linear interpolation and thus determine i(x; y; z). This process is shown by colouring successive pixels on the image plane 505 with different shades of grey, in order to emphasise the possibility of 1 to many mapping between voxels and pixels. Note that C is the camera 501 center and f the focal length of the camera. If the voxel projection on the image plane is smaller than 1 pixel, this means that the limit of precision has been achieved and the reconstruction can be terminated.

Figure 8:
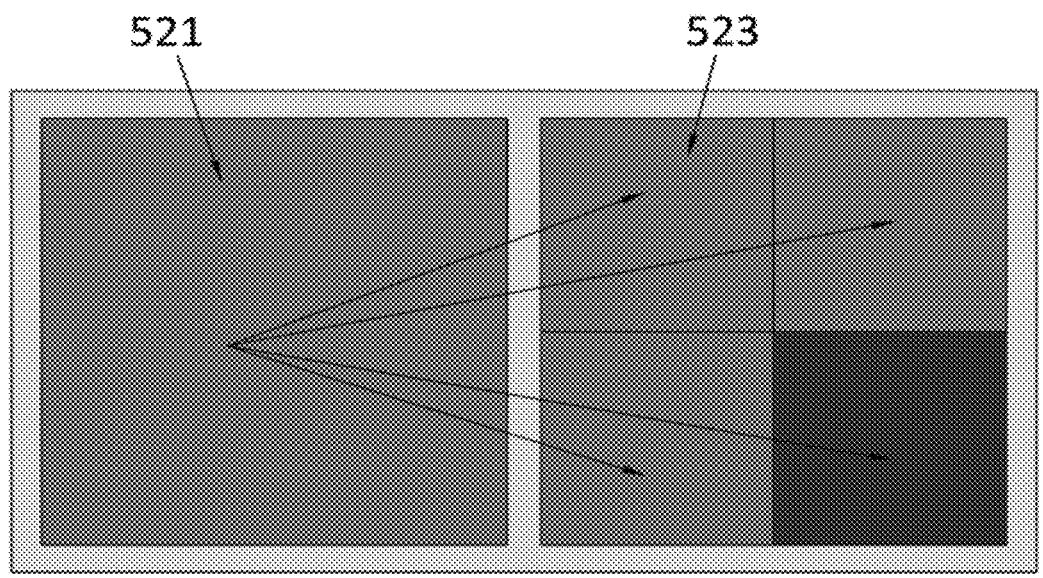
FIG. 8 is a diagram showing a node and its children in an octree implementation.

In FIG. 8, a hierarchical structure is shown where each node has a position in space (referred to as "x" above), a voxel 521 size s (used to determine the projection into image planes 505 for calculating i(x), see FIG. 7), a signed distance value d(x) as well as 8 pointers to the children nodes 523 of the next level (which can be null in case of a leaf node).

In FIG. 8, a node simply contains the information of a 3D cube (position, size), a SDF value (coded with the grayscale here; light grey is positive, dark grey is negative) as well as pointers to next level nodes corresponding to subdividing the box in all 3 dimensions (this 2D figure only shows 4 children nodes but in reality they are 8).

The initial voxel size is set in S401. In 403, the SDF is estimated. For the first time the algorithm is run, the SDF is estimated from the initial surface estimate from the MVS data. The process of estimating an SDF for a voxel is an iterative process. Using this SDF estimate, ray tracing is performed in step S405.

In FIG. 9(b) light grey shades 611, 613 denote voxels with positive SDF and dark grey/black shades denote those with negative SDF. An occlusion is detected when the tracing of the ray 601 from source 603 moves from a light to a dark voxel and thus it means that it has intersected the surface. When an occlusion is detected, the visibility weights in equation (10) are set to zero for the light/camera position where the occlusion has occurred. However, as there are many light/camera positions for each voxel, only weights where an occlusion has been detected will be set to zero.

The non-zero visibility weights are then calculated in step S407 as explained above following equation (9). Then the SDF is re-estimated using equation (14).

In step S404, it is determined if the SDF estimate has converged. If it has not, ray tracing is performed and the visibility weights are updated in step S407. The sdf is then re-estimated in step S404 until convergence.

Once the sdf for a voxel has converged. Is it determined whether a subset of voxels need to be subdivided. In an embodiment this is done by comparing the size of the SDF with the size of the voxel. In an embodiment, voxels where the absolute value of SDF is smaller than 2 voxel sizes are selected. These voxels with therefore be closer to the surface. These voxels are subdivided in step S413 and the process loops back to step S403 to estimate the SDF for these subdivided voxels using equation (14).

The procedure repeats until, in step S411, it is determined the voxels are small enough so as their projection on the image planes is smaller than the pixel size and thus the maximum obtainable resolution has been reached. As a result, only a small fraction of the volume is considered for calculations and the hierarchy of voxels is densely packed around the surface as shown in FIGS. 9(a) and 9(b) show how the proposed octree SDF parameterisation accelerates ray-tracing compared to fixed resolution parameterisations. As the size of the voxels is variable, fewer of them need to be examined in contrast to (a), where the ray is traced on a fixed resolution depth map.

The zero level set of the SDF is then obtained in S415. Here, the voxels where the value of the SDF which is as close to zero as allowed by the resolution are taken to be the surface. The reconstructed surface is then computed in step S417 using for example a Marching cubes technique, for example the variant discussed in M. Kazhdan, A. Klein, K. Dalal, and H. Hoppe. Unconstrained isosurface extraction on arbitrary octrees. In ESGP, 2007. In Marching cubes The premise of algorithm is to divide the input volume into a discrete set of cubes. By assuming linear reconstruction filtering, each cube, which contains a piece of a given isosurface, can easily be identified because the sample values at the cube vertices must span the target isosurface value. For each cube containing a section of the isosurface, a triangular mesh that approximates the behavior of the trilinear interpolant in the interior cube is generated.

In order to deal with scenes with a complex geometry and multiple objects, occlusions and cast shadows need to be addressed. In an embodiment, this is performed by ray-tracing lines from each voxel to each light source and camera and using the current estimate of the geometry. Octree structures allow for very quick visibility checks and whenever an occlusion/shadow is detected, the relevant weight in (10) is set to 0.

The volumetric approach described herein allows for very fast visibility estimations, especially when implemented as an octree. Indeed, assuming a voxel grid of dimension N×N×N, then the number of voxels around the surface are expected to be $(N^2)$. Then, for each voxel, visibility calculations only require examining $\mathcal{O}(\log N)$ (as illustrated in the caption of FIG. 9(b)) as opposed to $\mathcal{O}(N)$ operations for a dense volume/depth map parameterisation or $\mathcal{O}(N^2)$ operations required in a mesh-parameterisation framework (i.e. check all ray-box intersections).

Thus the total complexity is $(N^2 \log N)$ as opposed to $\mathcal{O}(N^3)$ for dense depth map parameterisation and $\mathcal{O}(N^4)$ in mesh parameterisation.

The method was implemented in Matlab with the octree code using c++ in a mex file.

FIGS. 10(a) and 10(b) are an illustration of increase of surface quality after each voxel subdivision step. The figure shows the different level of details that are encoded at each tree level. For this example, the octree was initialised with depth 7 and after 3 subdivision steps reached depth 10, reducing the voxel size by a factor of 8 and increasing the voxel count from around 96K to around 4.2M. The resulting final surface consists of 1.1M vertices and 2.2M triangles.

In practice, for the examples of FIG. 10(a) the tree reached level 10 hence N=210=1024 thus the speedup compared to the other parameterisations is around×100 and ×10$^5$ respectively. In practice, raytracing visibilities as well as cast shadows to all the views took only a few minutes on these datasets.

With the aim to prove the capability of the approach described herein to reconstruct complex scenes, experiments were performed using both synthetic and real data.

Figure 11:
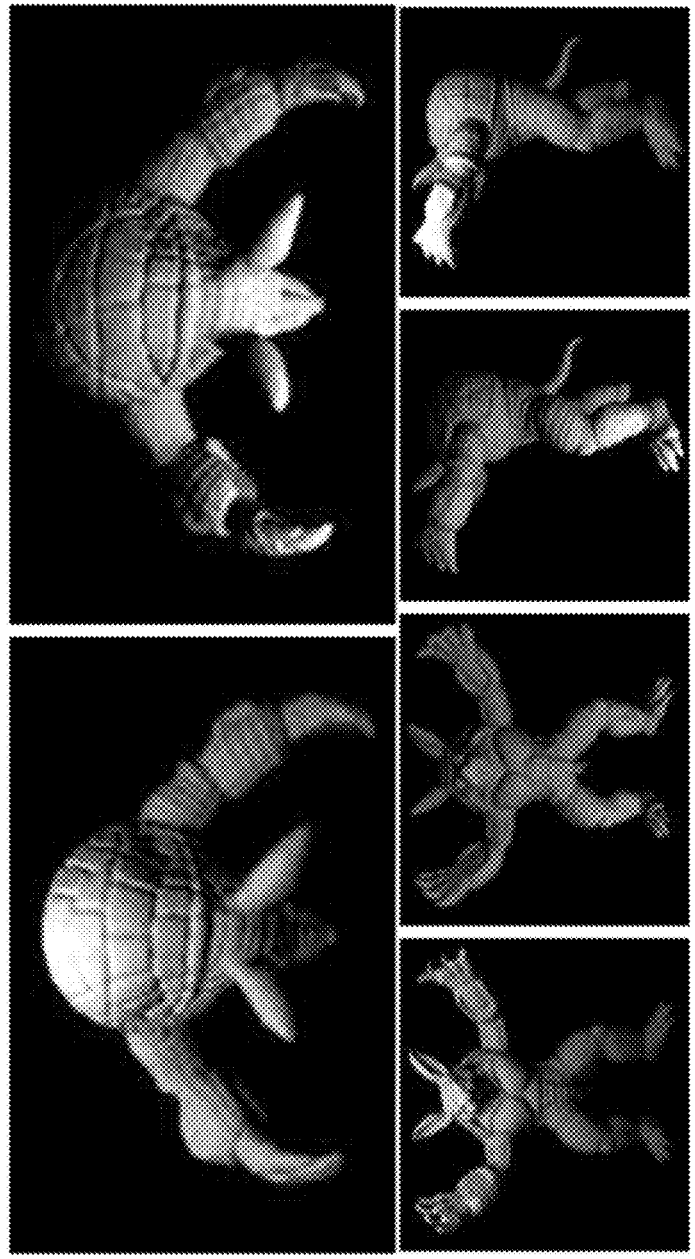
FIG. 11 shows test data from a synthetic test database.

For the synthetic case, we used the Armadillo model shown in FIG. 11 was used from the Stanford 3D Scanning Repository. The virtual object was scaled to have approximate radius 20 mm and the virtual camera of focal length 6 mm was placed in several locations on a sphere of 45 mm around the object.

The model was rendered 12 views with 8 images each of resolution 1200×800×24 bits per pixel. FIG. 11 shows synthetic data samples of the object from different viewing and lighting angles that shows the occlusion issues. The top two figures are from the same viewing direction, but different illumination directions. On the bottom row, the two left hand images are from the same viewing direction, but different illumination directions and the two right hand images are from the same viewing direction, but different illumination directions.

Figures 12A, 12B:
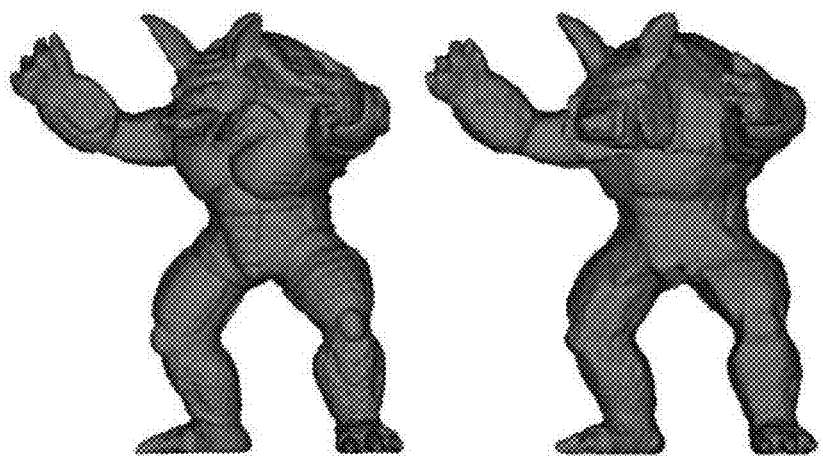
FIG. 12($a$) shows the ground truth of the model of FIG. 11.
Figures 12C, 12D, 12E:
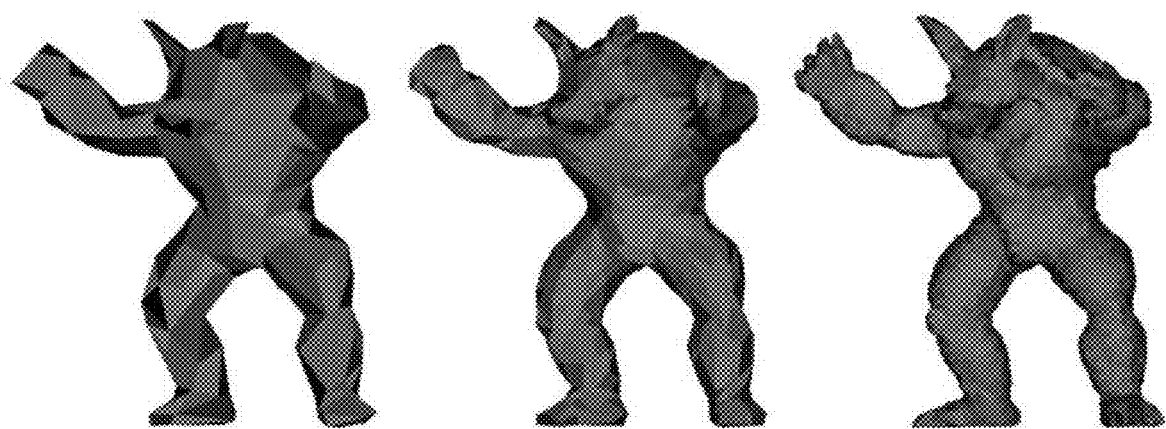

FIGS. 12(a) to (e) shows results from the synthetic data example. FIG. 12(a) shows the ground truth and FIG. 12(h) the visual hull. FIGS. 12(c) to (e) show Synthetic data initial estimates used for initialising the PSoptimisation. The variable quality initial estimates of the bottom row are generated by subsampling the ground truth of FIG. 12(a) using the edge collapse decimation function of Mesh-lab. FIG. 12(c) is for 500 triangles, FIG. 12(b) for 1500 triangles and FIG. 12(e) for 10,000 triangles.

In order to quantitatively describe the dependency of the accuracy of the volumetric reconstruction to the initial estimate, the initial mesh was subsampled to 5 different meshes with number of triangles ranging from 250 to 30K (the original mesh was 150k triangles). For each of these meshes Gaussian noise was added to the vertex coordinates with std 0, 5, 10% of the average triangle size. Finally, the objects' visual hull with naive voxel carving was calculated for a final experiment.

Figure 13A:
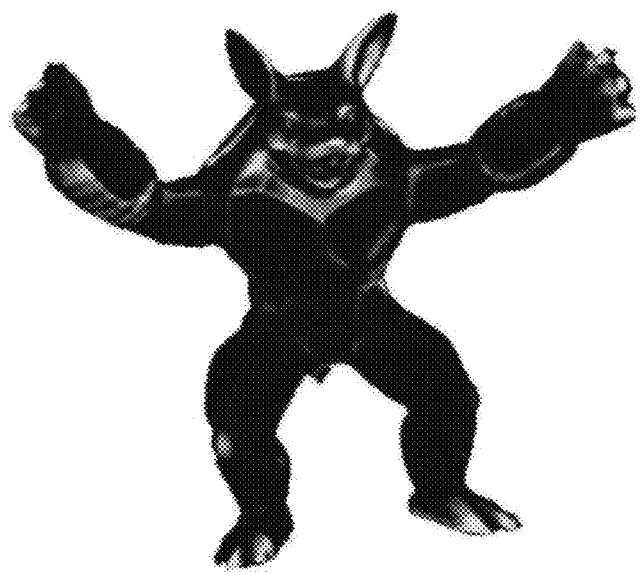
FIG. 13($a$) shows results from a method in accordance with an embodiment for the ground truth of FIG. 11 and FIG. 13($b$) shows the results for the visual hull.
Figure 13B:

The evaluation metric is the RMS Hausdorff distance to the ground truth (computed with Meshlab). Results are shown in FIG. 13 and Table 1. FIG. 13(a) is the estimate of the ground truth (RMS error 0.141 mm) and FIG. 13(b) of the visual hull (RMS error 0.305 mm).

Table 1

| Experiment | | Triangle Number | | | | | Visual Hull |
|---|---|---|---|---|---|---|---|
| Method | Noise | 250 | 500 | 1500 | 10K | 30K | 14K |
| [32] | 0% | 0.245 | 0.141 | 0.105 | 0.029 | 0.025 | 0.370 |
| | 5% | 0.290 | 0.172 | 0.119 | 0.036 | 0.029 | — |
| | 10% | 0.393 | 0.250 | 0.153 | 0.046 | 0.031 | — |
| Proposed | 0% | 0.203 | 0.114 | 0.090 | 0.026 | 0.023 | 0.293 |
| | 5% | 0.234 | 0.137 | 0.104 | 0.033 | 0.024 | — |
| | 10% | 0.321 | 0.193 | 0.131 | 0.043 | 0.028 | — |

The above volumes were reconstructed assuming an uniform value for this shininess parameter c=0.2.

Figure 15:
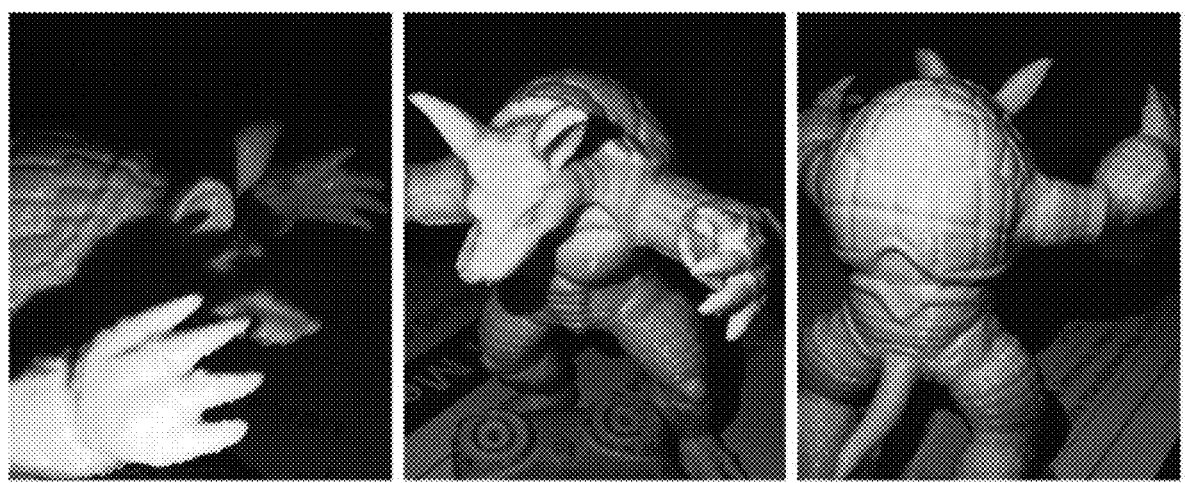
FIG. 15 shows sample images from a dataset of real data.
Figure 16:
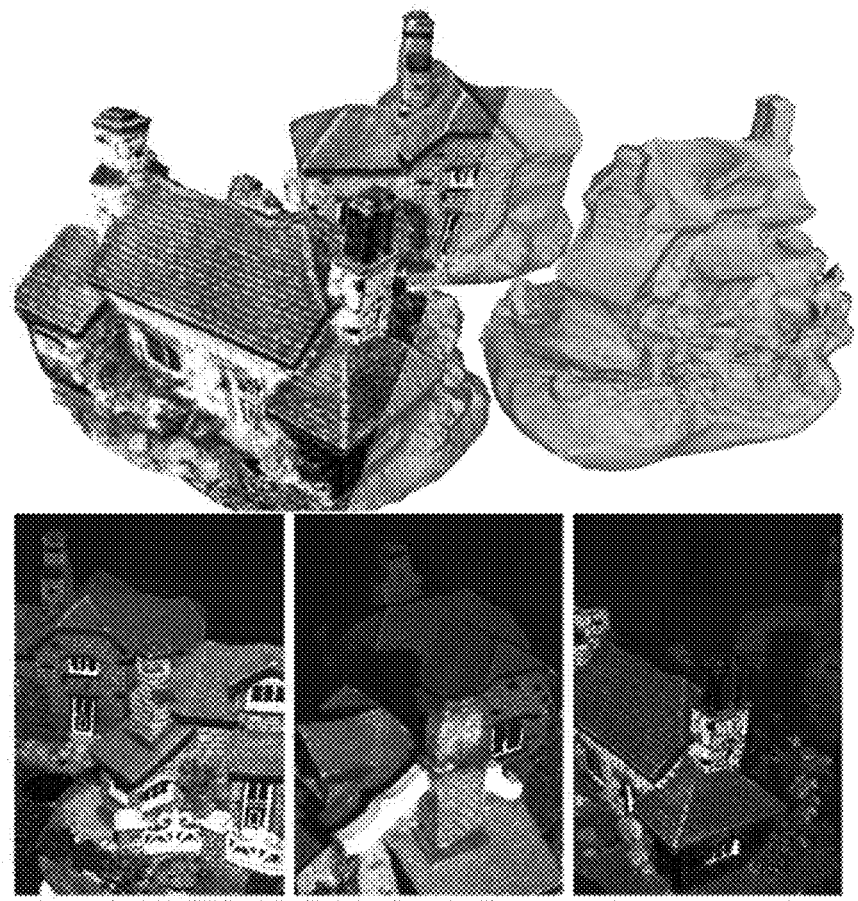
FIG. 16 shows a 3D reconstruction of a three (toy) house scene with and without albedo, respectively left and right side. Bottom row: sample images. The scene scale is indicated by the coin on left bottom image.

The real-world datasets include a marble Buddha statue, plaster bust of Queen Elizabeth (FIG. 14), a plastic 3D printed version of the Armadillo next to an owl statue (FIG. 15) as well as toy village scene (FIG. 16).

Figure 14:
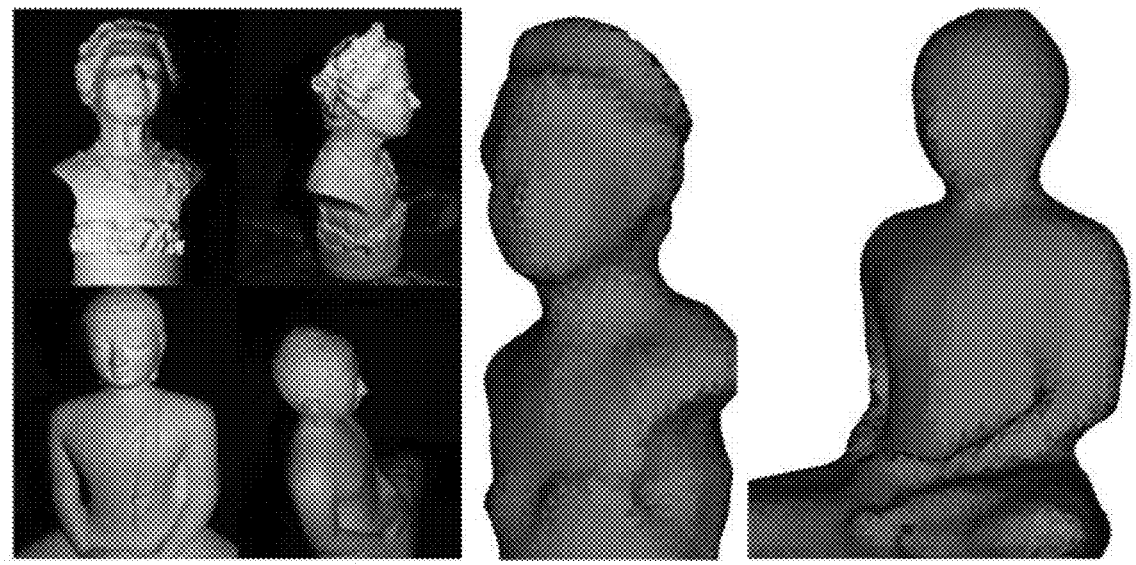
FIG. 14 shows real data and initial estimate for two statues.

FIG. 14 shows Real data: 2/108 photometric stereo images (12 views with 9 lights in each view were used) and initial geometry estimate was obtained with MVS. This initial estimates are only 8k and 11k triangles for the Queen and Buddha datasets respectively.

The experiments were run on a server machine. The computational requirements were 15-20 GB of RAM and 10-20 minutes of CPU time for the synthetic experiments and the single object datasets showed in FIG. 14. FIGS. 15 and 16 correspond to much bigger volumes and thus they needed around 2 hours and 150 GB of RAM; this cost is justified by the fact that the octree was allowed to grow to around 30M voxels of size 0.2 mm which is required to cover the few litters volume.

In the simple objects (see FIG. 17) the method described herein is able to obtain very detailed surfaces as it is not limited by the initial estimate and iteratively refines the surface to the limit of precision. The method is not limited by the initial estimates as it is used to create a 2D domain and the calculate a displacement map.

The octree implementation which naturally allows continues refinement and different level of precision in different parts of the scene.

Figure 17:
FIG. 17 shows qualitative evaluation on real data set of FIG. 14.

FIG. 17 shows qualitative evaluation on real data set of FIG. 14. The proposed generates detailed reconstructions.

Figure 18:
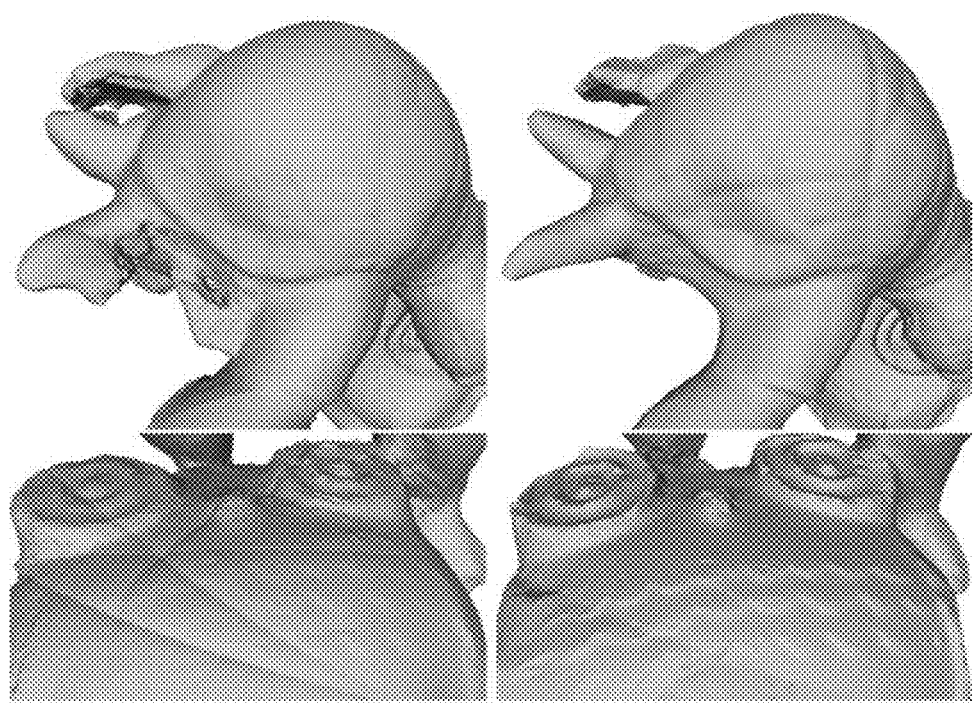
FIG. 18 shows close-up renderings showing comparison of prior art (left) to the proposed method (right) for the dataset of FIG. 15.

FIG. 18. Closeup renderings showing comparison of prior art (left) to the proposed method (right) for the dataset of FIG. 15

Figure 19:
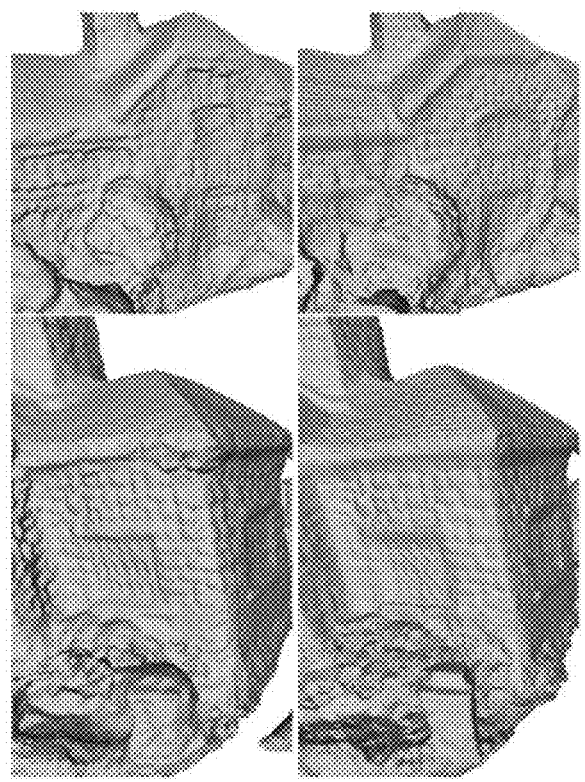
FIG. 19 shows close-up renderings showing comparison of prior art (left) to the proposed method (right)

FIG. 19. Closeup renderings showing comparison of prior art (left) to the proposed method (right). Note that the proposed method is clearly outperforming the competition, especially in the top row which corresponds to a view in the middle of the scene which is particularly challenging due to cast shadows (see FIG. 16).

Figure 20:
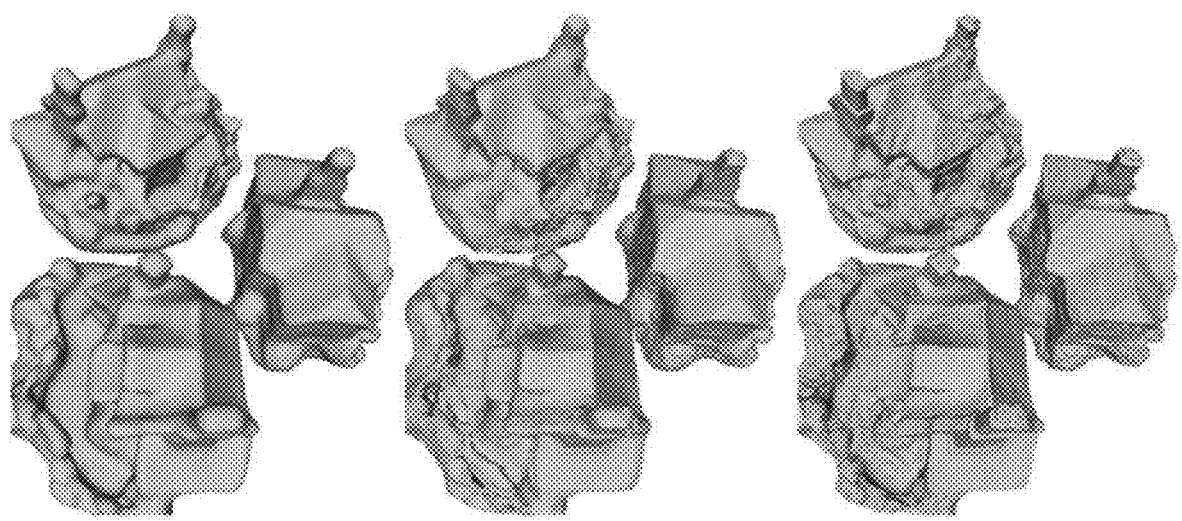
FIG. 20 top view of the reconstruction of the 'village' dataset presented in FIG. 16. This includes the initial geometry estimate obtained with SFM (left), other methods (middle) and the proposed method (right).

FIG. 20. Top view of the reconstruction of the 'village' dataset presented in FIG. 16. This includes the initial geometry estimate obtained with SFM (left), other methods (middle) and the proposed method (right).

Figure 21:
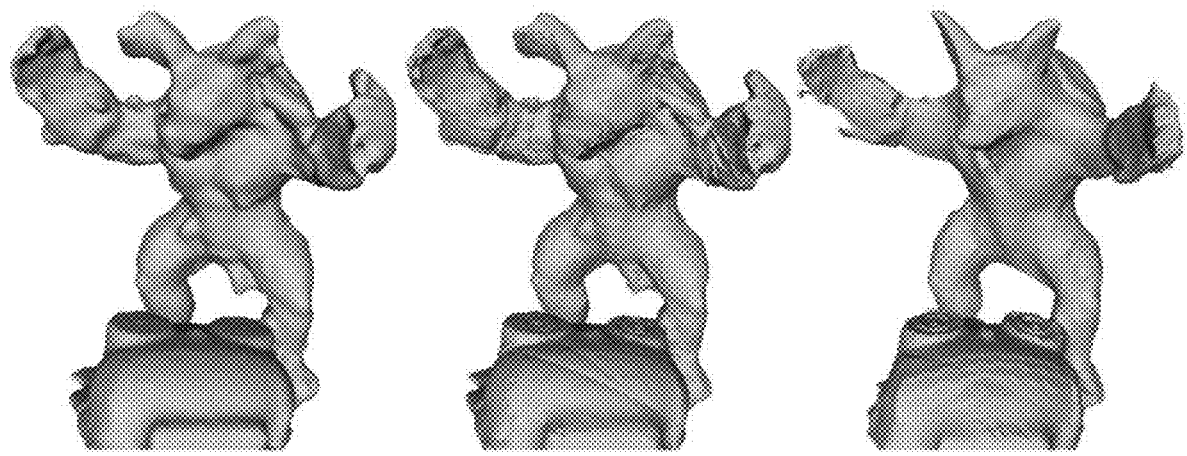
FIG. 21 top view of the reconstruction of the armadillo dataset of FIG. 11.

FIG. 21. Top view of the reconstruction of the armadillo dataset. This includes the initial geometry estimate obtained with SFM.

Figure 22:
FIG. 22 shows results of albedo-mapped reconstruction of the datasets in FIGS. 15 and 16. The albedo is calculated using simple least squares on Equation (2) using the final geometry estimate (along with occlusion/shadow maps). Black albedo regions signify that this particular part of the surface is not visible in any image. (left) prior art (middle) and the proposed method (right)

FIG. 22. Albedo-mapped reconstruction of the 2 multi-object datasets. The albedo is calculated using simple least squares on Equation (2) using the final geometry estimate (along with occlusion/shadow maps). Black albedo regions signify that this particular part of the surface is not visible in any image. (left) prior art (middle) and the proposed method (right).

The above methods perform very well on a challenging dataset where the existence of cast shadows highly degrades the quality of the reconstructions. This is expected as the method ray-traces cast shadows. Finally, albedo colourised reconstructions can be seen in FIG. 22.

Methods in accordance with the above embodiments present the first volumetric parameterisation based on the signed distance function for the MVPS problem.

Very high accuracy is achieved by using an octree implementation for processing and ray-tracing the volume on a tree. While considering photometric stereo images, the above fully differential formulation is albedo independent as it uses the irradiance equation ratio approach for the near-field photometric stereo.

In an embodiment, the image ratio based modeling can be extended in order to handle specular highlights. This requires enhancement of the variational solver with the inclusion of a shininess parameter, as an additional unknown per voxel.

Figure 23:
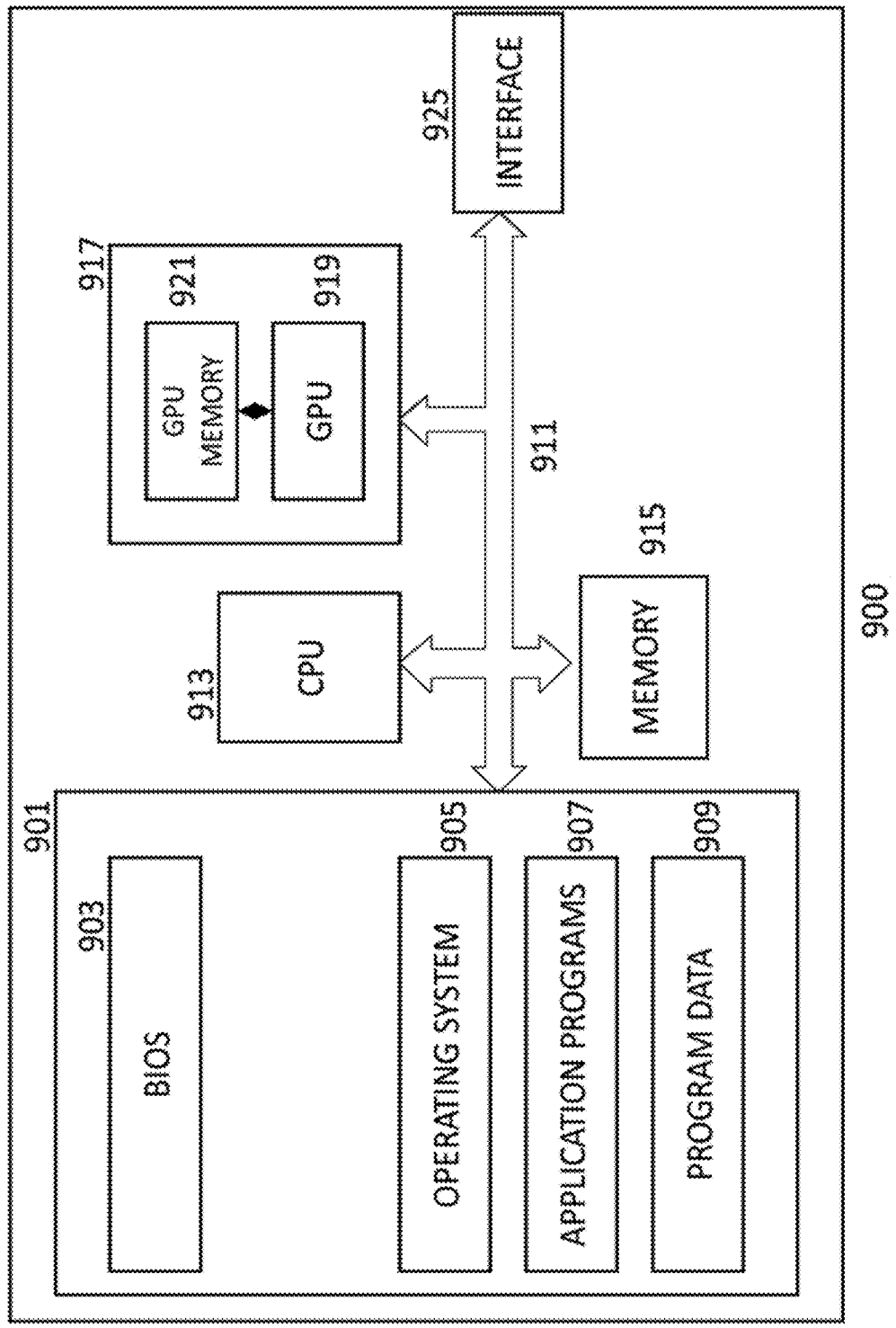
FIG. 23 is a system in accordance with an embodiment.

FIG. 23 is a schematic of the hardware that can be used to implement methods in accordance with embodiments. It should be noted that this is just one example and other arrangements can be used.

The hardware comprises a computing section 900. In this particular example, the components of this section will be described together. However, it will be are not necessarily co-located.

Components of the computing system 900 may include, but not limited to, a processing unit 913 (such as central processing unit, CPU), a system memory 901, a system bus 911 that couples various system components including the system memory 901 to the processing unit 913. The system bus 911 may be any of several types of bus structure including a memory bus or memory controller, a peripheral bus and a local bus using any of a variety of bus architecture etc. The computing section 900 also includes external memory 915 connected to the bus 911.

The system memory 901 includes computer storage media in the form of volatile/or non-volatile memory such as read-only memory. A basic input output system (BIOS) 903 containing the routines that help transfer information between the elements within the computer, such as during start-up is typically stored in system memory 901. In addition, the system memory contains the operating system 905, application programs 907 and program data 909 that are in use by the CPU 913.

Also, interface 925 is connected to the bus 911. The interface may be a network interface for the computer system to receive information from further devices. The interface may also be a user interface that allows a user to respond to certain commands et cetera.

In this example, a video interface 917 is provided. The video interface 917 comprises a graphics processing unit 919 which is connected to a graphics processing memory 921.

Graphics processing unit (GPU) 919 is particularly well suited to the above described method due to the operation of this multiple parallel calls. Therefore, in an embodiment, the processing may be divided between CPU 913 and GPU 919.

In one embodiment, the GPU is a NVIDIA 1080Ti with 11 Gb memory.

The above described architecture also lends itself to mobile telephones using GPUs.

The above methods are capable of merging multi-view imaging techniques with multiple shading information viewpoint (photometric stereo). this makes the 3D volumetric reconstruction more detailed with respect to competing approaches. This is due to the fact that the proposed approach can parameterise near-field photometric stereo data more reliably by modelling the physical phenomena as light propagation and attenuation with a more consistent mathematical model. Furthermore, light reflection is also parameterised in order to handle both diffuse and specular reflections in a single mathematical model. This allows the derivation of geometrical information from photometric images of metallic objects.

As described above, a ray tracing process is used for determining reliable visibility and shadowed areas of objects or scenes having complex geometry. In order to ray-trace light beams and camera visibility efficiently, in an embodiment, an Octree implementation has been proposed.

The experimental setup user data acquisition consist of 2 RGB cameras and several LEDs use for lighting the scene under observation. An Arduino microcontroller is used to synchronise LEDs and cameras so as to take a single image per LED. Different from other technologies based on expensive components, the method described above is based on inexpensive components.

In the above implementations, multiple photometric images are used to improve a coarse 3D reconstruction obtained with standard multi-view techniques.

In an embodiment, to project highly accurate details on the volumetric reconstruction, the light propagation is parameterise with dedicated mathematical models describing light propagation and attenuation.

In an embodiment, to deal with visibility problems of the objects from multiple camera positions, a ray-trace algorithm is capable of establishing cast shadows as well as detecting invisible regions of every image.

The above allows 3D scanning technology capable of retrieving accurate details on a surface. It also allows volumetric 3D reconstruction of objects for a number of applications in quality control, manufacturing, inverse engineering et cetera.

The technology is capable of retrieving 3D volumetric ships providing submillimetre details of the surface of the object under inspection.

In summary, embodiments the above provide:
- a 3D volumetric reconstruction using differential parameterisation of the volume with the signed distance function merging multi-view and photometric stereo imaging data;
- A variational optimisation that fuses information from multiple viewpoints together with photometric stereo images in a single system;
- an irradiance equation that deals with neo-field photometric stereo imaging a models point light propagation and attenuation in conjunction with specular and diffuse reflections;
- an octree implementation capable of re-tracing visibility information as well as shadows that are crucially important in scenes with multiple discrete objects.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A system for producing a 3D image of an object, the system comprising:
   a processor adapted to receive multi-view stereo photometric data, said multi-view photometric stereo data comprising a first set of image data, wherein said first set of image data comprises images captured by a first camera at a plurality of positions with illumination from different illumination directions such that there are a plurality of images from a different illumination direction for each position of the first camera,
   said processor being adapted to process said multi-view photometric stereo data using a photometric stereo approach with a formulation of irradiance using a reflection model that models both diffuse and specular reflection, wherein
   the photometric stereo approach determines a position of a surface of the object by using a signed distance function where the signed distance function determines a distance from a point to a surface, wherein the signed distance function is related to a surface normal:

$$n(x) = \nabla d(x). \tag{1}$$

where n(x) is the surface normal at 3D point x, d(x) is the signed distance function at the 3D point x and $\nabla$ is a gradient operator, the signed distance function being substituted for the surface normal when modelling the irradiance.

2. The system according to claim 1, wherein the processor is adapted to receive stereo image data, said stereo image data comprising a second set of image data, said image data comprising pairs of images, wherein each pair of images is an image taken by the first camera and an image taken by a second camera with a known position with respect to the first camera, the processor being adapted to determine a global position of the first and second cameras for each pair of images.

3. The system according to claim 2, wherein the first and second cameras have different fields of view.

4. The system according to claim 3, wherein the first and second cameras are provided on a mount that is moveable, said first camera is provided surrounded by a plurality of individual light sources, said individual light sources being controllable such that just one light source can be controlled to be on at any one time.

5. The system according to claim 3, wherein the surface is indicated when the signed distance function is at a minimum.

6. The system according to claim 2, wherein the processor processes the photometric stereo data using a volumetric approach, wherein a volume containing the object is subdivided into voxels and the signed distance function is calculated per voxel.

7. The system according to claim 6, wherein the processor is adapted to process the photometric stereo data using an iterative approach, wherein a voxel size is set to a first size and then subdivided further if the signed distance function is below a threshold.

8. The system according to claim 6, wherein the processor is adapted to obtain an initial estimate of the signed distance function from the stereo image data.

9. The system according to claim 6, wherein the processor is adapted to perform ray tracing a voxel towards the first camera or a light to determine an occlusion.

10. The system according to claim 9, wherein the occlusion is determined from a change in sign of the signed distance function between voxels along the ray being traced.

11. The system according to claim 2, wherein the processor is adapted to determine the irradiance using the reflection model that models both diffuse and specular reflection using a parameter that indicates shininess of the surface of the object.

12. A system for producing a 3D image of an object, the system comprising:
   a processor adapted to receive multi-view stereo photometric data, said multi-view photometric stereo data comprising a first set of image data, wherein said first set of image data comprises images captured by a first camera at a plurality of positions with illumination from different illumination directions such that there are a plurality of images from a different illumination direction for each position of the first camera,
   said processor being adapted to process said multi-view photometric stereo data using a photometric stereo approach with a formulation of irradiance using a reflection model that models both diffuse and specular reflection, wherein the processor is adapted to determine the irradiance using the reflection model that models both diffuse and specular reflection using a Blinn Phong reflection model:

$$i_k(u) = i_k(x) = \rho(x)a_k(x)(\bar{n}(x) \cdot \overline{w}_k(x))^{\frac{1}{c(x)}} \quad (2)$$

where $u \in \mathbb{R}^2$ is an image-plane projection of 3D point x, $\rho(x)$ indicates an albedo, $a_k(x)$ indicates an attenuation, $c(x)$ indicates shininess and wk(x) is a weighted half vector:

$$w_k(x) = \bar{l}_k(x) + \min\left\{1, \frac{|1-c(x)|}{\varepsilon}\right\}\bar{v}_q(x) \quad (3)$$

with $v_q(x)$ being $q^{-th}$ viewing direction on a volume for camera position $C_q$ and $\varepsilon$ is a transition parameter.

13. The system according to claim 12, wherein the processor is adapted to process a plurality of image pairs, wherein each image pair comprises a pair of images from a same camera viewpoint illuminated from different illumination directions and the plurality of image pairs comprises images from different camera viewpoints, wherein a visibility weight is applied to each image pair.

14. The system according to claim 13, wherein each image pair is processed to produce:

$$b_{hk}(x) \cdot \nabla d(x) = 0 \quad (7)$$

where $$b_{hk}(x) = \overline{w}_k(x)(i_n(x)a_k(x))^{c(x)} - \overline{w}_h(x)(i_k(x)a_h(x))^{c(x)}. \quad (8)$$

and the visibility weighting is applied to $b_{hk}(x)$.

15. The system according to claim 14, wherein the processor is adapted to solve the equation (7) as a weighted least squares problem.

16. The system according to claim 15, wherein the processor is adapted to solve the least squares problem using an iterative process.

17. An inspection apparatus, said inspection apparatus comprising:
the system according to claim 1;
the first camera;
a second camera; and
a plurality of spatially distributed light sources.

18. A method for producing a 3D image of an object, the method comprising:
receiving multi-view stereo photometric data, said multi-view photometric stereo data comprising a first set of image data, wherein said first set of image data comprises images captured by a first camera at a plurality of positions with illumination from different illumination directions such that there are a plurality of images from a different illumination direction for each position of the first camera; and
processing said multi-view photometric stereo data using a photometric stereo approach with a formulation of irradiance using a reflection model that models both diffuse and specular reflection, wherein
the photometric stereo approach determines a position of a surface of the object by using a signed distance function where the signed distance function determines a distance from a point to a surface, wherein the signed distance function is related to a surface normal:

$$n(x) = \nabla d(x). \quad (1)$$

where n(x) is the surface normal at 3D point x, d(x) is the signed distance function at the 3D point x and $\nabla$ is a gradient operator, the signed distance function being substituted for the surface normal when modelling the irradiance.

19. A non-transitory carrier medium carrying computer readable instructions which, when executed by a computer, cause the computer to perform the method of claim 18.

* * * * *